US009202491B2

(12) United States Patent
Chen et al.

(10) Patent No.: US 9,202,491 B2
(45) Date of Patent: Dec. 1, 2015

(54) PLANAR PLASMON GENERATOR WITH THICKENED REGION AND PEG REGION

(71) Applicant: Seagate Technology LLC, Cupertino, CA (US)

(72) Inventors: Weibin Chen, Bloomington, MN (US); Werner Scholz, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 67 days.

(21) Appl. No.: 14/230,308

(22) Filed: Mar. 31, 2014

(65) Prior Publication Data

US 2015/0279399 A1    Oct. 1, 2015

(51) Int. Cl.

| | | |
|---|---|---|
| *G11B 11/00* | (2006.01) | |
| *G11B 5/48* | (2006.01) | |
| *G11B 5/60* | (2006.01) | |
| *G11B 5/31* | (2006.01) | |
| *G11B 13/08* | (2006.01) | |
| *G11B 5/00* | (2006.01) | |

(52) U.S. Cl.
CPC .............. *G11B 5/4866* (2013.01); *G11B 5/314* (2013.01); *G11B 5/3133* (2013.01); *G11B 5/6082* (2013.01); *G11B 5/6088* (2013.01); *G11B 13/08* (2013.01); *G11B 5/3116* (2013.01); *G11B 2005/0021* (2013.01)

(58) Field of Classification Search
CPC ...................... G11B 5/4866; G11B 2005/0021; G11B 5/314; G11B 5/6088; G11B 2005/001; G11B 7/1387; G11B 5/3116; G11B 13/045; G11B 11/10554; G11B 5/3133; G11B 5/3163; G11B 13/08

USPC ...................... 369/13.33, 13.13, 13.02, 13.01
See application file for complete search history.

(56) References Cited

U.S. PATENT DOCUMENTS

| | | | |
|---|---|---|---|
| 7,009,812 | B2 | 3/2006 | Hsa et al. |
| 7,239,480 | B2 | 7/2007 | Hirabayashi et al. |
| 7,272,079 | B2 | 9/2007 | Challener |
| 8,159,769 | B2 | 4/2012 | Batra et al. |
| 8,259,413 | B2 | 9/2012 | Bonhote et al. |
| 8,259,540 | B1 | 9/2012 | Sahoo et al. |
| 8,289,650 | B2 | 10/2012 | Seigler et al. |
| 8,320,219 | B1 | 11/2012 | Wolf et al. |
| 8,320,220 | B1 | 11/2012 | Yuan et al. |

(Continued)

FOREIGN PATENT DOCUMENTS

| | | |
|---|---|---|
| EP | 1398763 | 5/2006 |
| WO | WO2010103697 | 9/2010 |

*Primary Examiner* — Ali Neyzari
(74) *Attorney, Agent, or Firm* — Hollingsworth Davis, LLC

(57) ABSTRACT

An apparatus (e.g., a heat assisted magnetic recording read/write element) that has an optical component that extends to a location adjacent a media-facing surface of a slider body. The apparatus further includes a planar plasmon antenna that is disposed between the tip portion of the magnetic write pole and the optical component. The planar plasmon antenna can be formed of a plasmonic material operationally capable of a plasmonic excitation in response to an evanescent coupling with an optical mode of the optical component. In some instances, the planar plasmon antenna includes an enlarged region spaced from the optical component and a peg region formed in the enlarged region. The peg region has a thickness in a direction substantially transverse to the optical component that is less than a thickness of a portion of the enlarged region that spaces the peg region from the optical component.

20 Claims, 7 Drawing Sheets

(56) References Cited

U.S. PATENT DOCUMENTS

| | | |
|---|---|---|
| 8,331,205 B2 | 12/2012 | Seigler et al. |
| 8,339,739 B2 | 12/2012 | Balamane et al. |
| 8,351,305 B2 | 1/2013 | Zhao et al. |
| 8,391,108 B2 | 3/2013 | Peng et al. |
| 8,405,932 B2 * | 3/2013 | Seigler et al. ............ 360/125.3 |
| 8,406,094 B2 | 3/2013 | Matsumoto |
| 8,416,647 B1 | 4/2013 | Zhao et al. |
| 8,451,555 B2 * | 5/2013 | Seigler et al. ................. 360/59 |
| 8,509,037 B1 | 8/2013 | Huang et al. |
| 8,514,673 B1 | 8/2013 | Zhao et al. |
| 8,599,656 B2 * | 12/2013 | Jin et al. .................... 369/13.33 |
| 8,619,514 B1 | 12/2013 | Matsumoto |
| 8,619,535 B2 * | 12/2013 | Balamane et al. ....... 369/112.27 |
| 8,958,271 B1 * | 2/2015 | Peng et al. ................ 369/13.33 |
| 9,053,737 B2 * | 6/2015 | Huang et al. ......................... 1/1 |
| 2010/0214685 A1 | 8/2010 | Seigler et al. |
| 2012/0039155 A1 | 2/2012 | Peng et al. |
| 2012/0218871 A1 | 8/2012 | Balamane et al. |
| 2012/0314547 A1 | 12/2012 | Seigler et al. |
| 2013/0107679 A1 | 5/2013 | Huang et al. |
| 2013/0148485 A1 | 6/2013 | Jin et al. |
| 2014/0251948 A1 * | 9/2014 | Zhao et al. ...................... 216/24 |
| 2014/0254336 A1 * | 9/2014 | Jandric et al. ............. 369/13.33 |

* cited by examiner

PLANAR PLASMON GENERATOR WITH THICKENED REGION AND PEG REGION

SUMMARY

The present disclosure is related to an apparatus (e.g., a heat assisted magnetic recording read/write element) that has an optical component that extends to a location adjacent a media-facing surface of a slider body. The apparatus further includes a planar plasmon antenna that is disposed between the tip portion of the magnetic write pole and the optical component. The planar plasmon antenna can be formed of a plasmonic material operationally capable of a plasmonic excitation in response to an evanescent coupling with an optical mode of the optical component. In some instances, the planar plasmon antenna includes an enlarged region spaced from the optical component and a peg region formed in the enlarged region. The peg region has a thickness in a direction substantially transverse to the optical component that is less than a thickness of a portion of the enlarged region that spaces the peg region from the optical component.

In another embodiment, a system includes a magnetic write pole, an optical component, a planar plasmon antenna, first and second heat sinks, and a thermal diffuser. The magnetic write pole has a tip portion located proximate a media-facing surface. The optical component extends to a location adjacent the media-facing surface. The planar plasmon antenna is disposed between the tip portion of the magnetic write pole and a core of the optical component. The planar plasmon antenna has an enlarged region with a thickness in a direction substantially transverse to the optical component that exceeds a thickness of a peg region. The first heat sink region abuts the enlarged region and is disposed between the planar plasmon antenna and the write pole. The second heat sink region is disposed to a first side surface of the tip portion and extends away from the planar plasmon antenna. The thermal diffuser is disposed along one or more sides of the write pole and abuts both the first heat sink region and the second heat sink region.

In another embodiment, a method of forming an apparatus is disclosed. The method includes forming an optical component to a location adjacent a media-facing surface of a slider body and forming a planar plasmon antenna having an enlarged region and a peg region. A substantial portion of the enlarged region with a thickness of over 50 percent of a total thickness of the enlarged region is disposed between the peg region and the optical component.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

Figure 1:
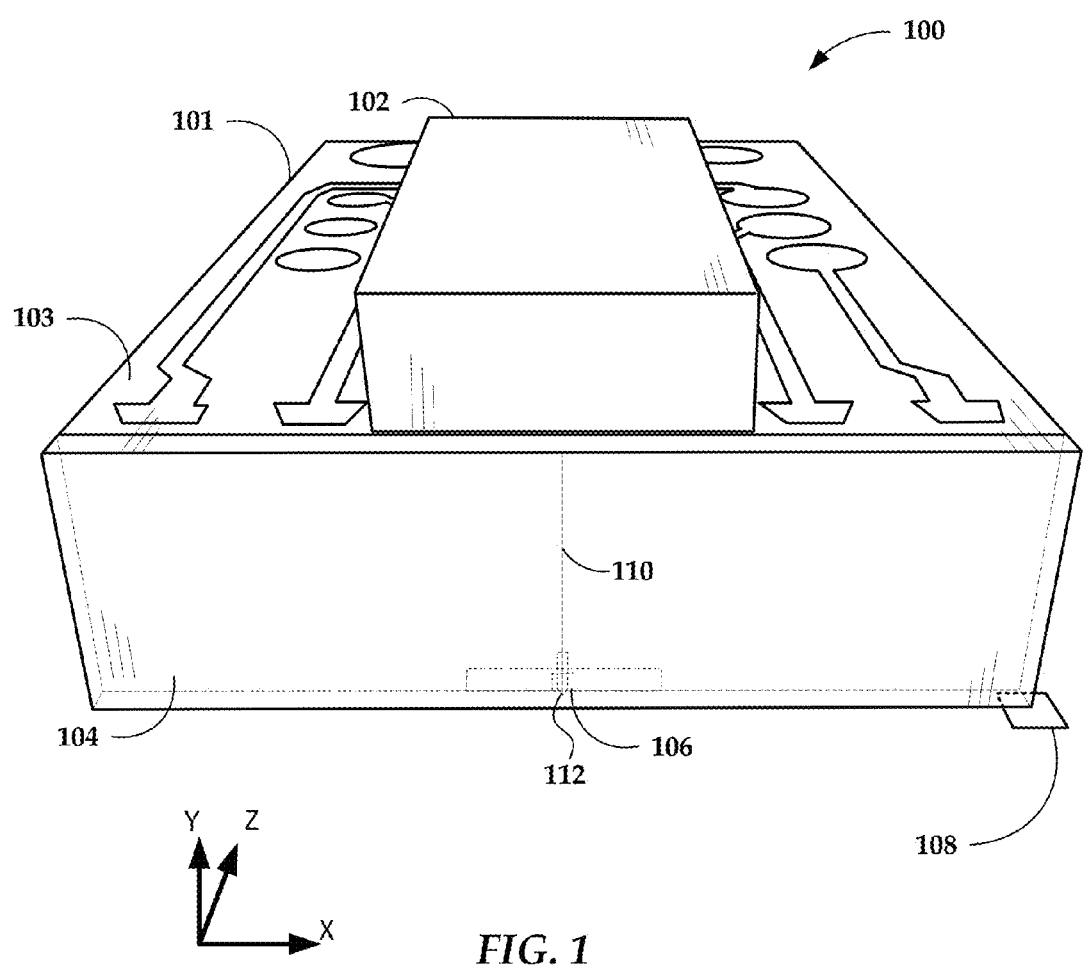
FIG. 1 is a perspective view of a slider assembly according to an example embodiment.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range. As used herein, the term "substantially" means within a few percent thereof. Thus, the term "substantially transverse" would mean within a few degrees of a perpendicular orientation.

The present disclosure is generally related to apparatuses, systems, methods, and techniques related to heat assisted magnetic recording ("HAMR"), sometimes referred to as thermally assisted magnetic recording ("TAMR"). A HAMR data storage medium uses a high magnetic coercivity that is able to overcome superparamagnetic effects (e.g., thermally-induced, random, changes in magnetic orientations) that currently limit the areal data density of conventional hard drive media.

Embodiments described herein include an apparatus (e.g., a HAMR read/write element) that has an optical component that extends to a location adjacent a media-facing surface of a slider body. The apparatus further includes a planar plasmon antenna that is disposed between the tip portion of the magnetic write pole and the optical component. The planar plasmon antenna can be formed of a plasmonic material operationally capable of a plasmonic excitation in response to an evanescent coupling with an optical mode of the optical component. In some instances, the planar plasmon antenna includes an enlarged region spaced from the optical component and a peg region formed in the enlarged region. The peg region has a thickness in a direction substantially transverse to the optical component that is less than a thickness of a portion of the enlarged region that spaces the peg region from the optical component.

The embodiments of the planar plasmon antenna and other components described herein allow for increased performance (e.g., a confined thermal gradient on the medium) and reliability (e.g., an increased media to head temperature ratio). Additionally, the arrangement of heat sinks/diffusers and cap described increases the reliability of various components of the apparatus including the planar plasmonic antenna.

A HAMR read/write element, sometimes referred to as a slider or read/write head, includes magnetic read and write transducers similar to those on current hard drives. For example, data may be read by a magnetoresistive sensor that detects magnetic fluctuations of a magnetic media as it moves underneath the sensor. Data may be written to the magnetic media by a write coil that is magnetically coupled to a write pole. The write pole changes magnetic orientation in regions of the media as it moves underneath the write pole. A HAMR slider will also generally include a source of energy, such as a laser diode, to heat the media while it is being written to by the write pole. An optical delivery path is integrated into the HAMR slider to deliver the energy to the surface of the media.

In some instances, the optical delivery path of a HAMR slider may be optically coupled to a planar plasmon antenna also called a planar plasmon generator ("PPG") or edge plasmon generator ("EPG"). The planar plasmon antenna is not only located adjacent to a core of the optical delivery path but also can be located adjacent a media-facing surface (e.g., air-bearing surface, contact surface). In further embodiments, the planar plasmon antenna structure can have a substantially triangular, parabolic, or rectangular cross-section in a plane perpendicular to the direction of plasmon propagation (generally described in reference to the y-axis direction). The energy source, (e.g., the laser diode) can be used to direct a beam of optical radiation to adjacent the planar plasmon antenna via the optical delivery path. The planar plasmon antenna acts as an optical antenna and is formed of plasmonic metals such as gold, silver, copper, aluminum, etc., and alloys thereof. As a result of the optical delivery path, an optical mode of incident radiation couples to a propagating edge plasmon mode in the planar plasmon antenna. As a result of the propagating edge plasmon mode, optical energy is converted into plasmon energy, which travels along the planar plasmon antenna. The planar plasmon antenna shapes and transmits the energy to a small region on the medium. As a result of the application of energy, a high temperature rise in a small region on the media, with the region exceeding the Curie temperature having dimensions less than 100 nm occurs. This also results in high temperature rise in the slider near the planar plasmon antenna due to optical losses in the delivery path.

In reference to FIG. 1, a perspective view shows a HAMR slider assembly 100 according to an example embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical components, such as a waveguide 110, are formed integrally within the slider body 101 (near a trailing edge surface 104 in this example) and function as an optical path that delivers energy from the laser diode 102 to the recording media via a planar plasmon antenna 112. The planar plasmon antenna 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top input surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide 110 discussed herein may be applicable to any type of light delivery configuration. For example, a laser may be mounted on the trailing edge surface 104 instead of the top input surface 103. In another configuration known as free-space light delivery, a laser may be mounted external to the slider assembly 100, and coupled to the slider by way of optic fiber and/or waveguide. An input surface of the slider body 101 may include a grating or other coupling feature to receive light from the laser via the optic fiber and/or waveguide.

Figure 2:
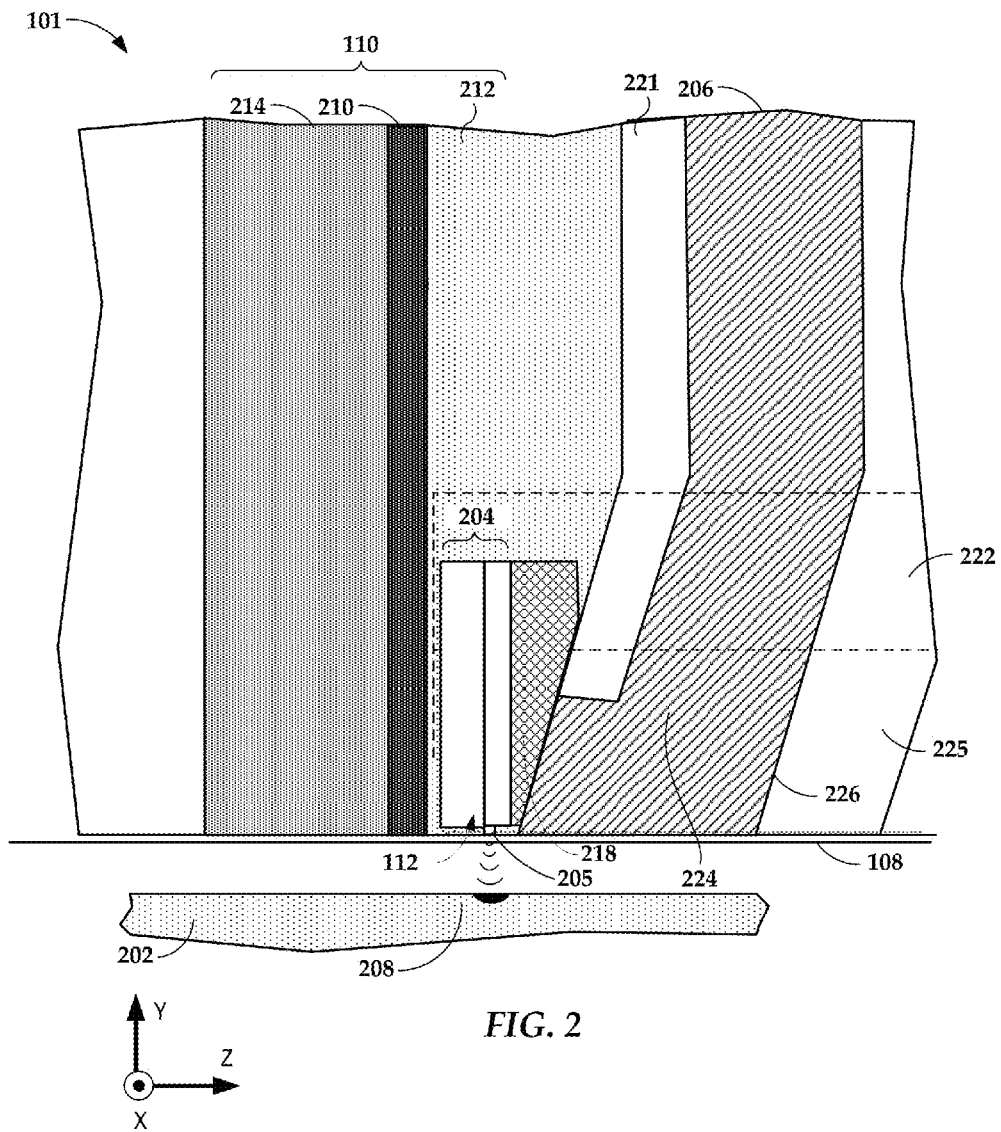
FIG. 2 is a cross sectional view of a slider assembly with a planar plasmon antenna according to an example embodiment.

In FIG. 2, a cross-sectional view illustrates portions of the slider body 101 near the planar plasmon antenna 112 according to an example embodiment. In this view, the planar plasmon antenna 112 is shown proximate to a surface of magnetic media 202, e.g., a magnetic disk. The waveguide 110 delivers electromagnetic energy to the planar plasmon antenna 112, which directs the energy to create a small hotspot 208 on the media 202. A magnetic write pole 206 causes changes in magnetic flux near the media-facing surface 108 in response to an applied current. Flux from the write pole 206 changes a magnetic orientation of the hotspot 208 as it moves past the write pole 206 in the downtrack direction.

The waveguide 110 includes a layer of core material 210 surrounding by cladding layers 212, 214. The core layer 210 and cladding layers 212, 214 may be made from dielectric materials such as $Al_2O_3$, SiOxNy, $SiO_2$, $Ta_2O_5$, $TiO_2$ or $Nb_2O_5$, etc. Generally, the dielectric materials are selected so that the refractive index of the core layer 210 is higher than refractive indices of the cladding layers 212, 214. This arrangement of materials facilitates efficient propagation of light through the waveguide 110.

The energy applied to the planar plasmon antenna 112 excites surface plasmons used to create the hotspot 208. This energy transfer can cause a significant temperature rise in the planar plasmon antenna 112. As discussed previously, the planar plasmon antenna 112 may be formed to have a substantially triangular cross-section in a plane (hereinafter denoted the x-y plane) perpendicular to the direction of plasmon propagation and may include an enlarged region 204 and a peg region 205 in the shape of a tip, peg, pin, bar, or other protrusion having relatively small dimensions in order to keep the generated plasmonic field small. As illustrated in the embodiment of FIG. 2, the peg region 205 extends from the enlarged region 204 toward the media-facing surface 108. The planar plasmon antenna 112 is formed from a relatively soft plasmonic metal (e.g., Au, Ag, Cu, Al, and alloys thereof) that is prone to deformation at high temperature. As a result, a first heat sink region 218 may be used proximate to (or integral with) the planar plasmon antenna 112. In the embodiment of FIG. 2, the first heat sink region 218 is disposed between the planar plasmon antenna 112 and the tip portion 224 of the write pole 206. The first heat sink region 218 may be thermally coupled to other components (e.g., a thermal diffuser 221, the write pole 206) in order to facilitate heat transfer away from the planar plasmon antenna 112.

To further dissipate heat from the planar plasmon antenna 112 and improve reliability, the illustrated slider body 101 includes a second heat sink region 222. The second heat sink region 222 can have portions comprised of different material in some embodiments. The second heat sink region 222 is located along a tip portion 224 of the write pole 206 that is proximate the media-facing surface 108. In some cases, the second heat sink region 222 is located proximate to at least a first side 226 of the tip portion that faces away from the planar plasmon antenna 112. The second heat sink region 222 can be formed of a thermally conductive metal (e.g., Au, Ag, Cu, Al, and alloys thereof) that may also be highly reflective.

The second heat sink region 222 is spaced away from the media-facing surface 108 to minimize exposure to air and other components by a cap 225 as some of the materials (e.g., Al, Cu) of the second heat sink region 222 are susceptible to corrosion. Similarly, some of the materials (e.g., Au, Ag) of the second heat sink region 222 are prone to smearing, and may cause galvanic corrosion on the write pole 206. As such, it may be desirable to limit exposure of these types of materials at the media-facing surface 108 with use of the cap 225.

The cap 225, which also acts as a heat sink, is located between the media-facing surface 108 and the second heat sink region 222. In some instances, the cap 225 is formed of materials such as metals like Cr, Ta, Ru, Rh, W, and alloys thereof. Additionally, the cap 225 may be formed of dielectrics such as alumina, silica, diamond-like-carbon (DLC) or SiC. The cap 225 may be configured to thermally protrude from the media-facing surface 108 farther than the peg region 205 in response to plasmonic excitation of the planar plasmon antenna 112. This may help prevent the planar plasmon antenna 112 from contacting a media surface, which could result in corrosion of the media and/or media-facing surface 108 of the slider body 101.

The slider body 101 may also include a thermal diffuser 221 to further dissipated heat. The thermal diffuser 221 can be formed of a relatively soft, thermally conductive metal (e.g., Au, Ag, Cu, Al, and alloys thereof). The thermal diffuser 221 is spaced away from the media-facing surface 108, and faces the same side of the write pole 206 as the planar plasmon antenna 112. The thermal diffuser 221 abuts the first heat sink region 218 near the tip portion 224 and additionally abuts the second heat sink region 222 as will be described subsequently.

Figure 3:
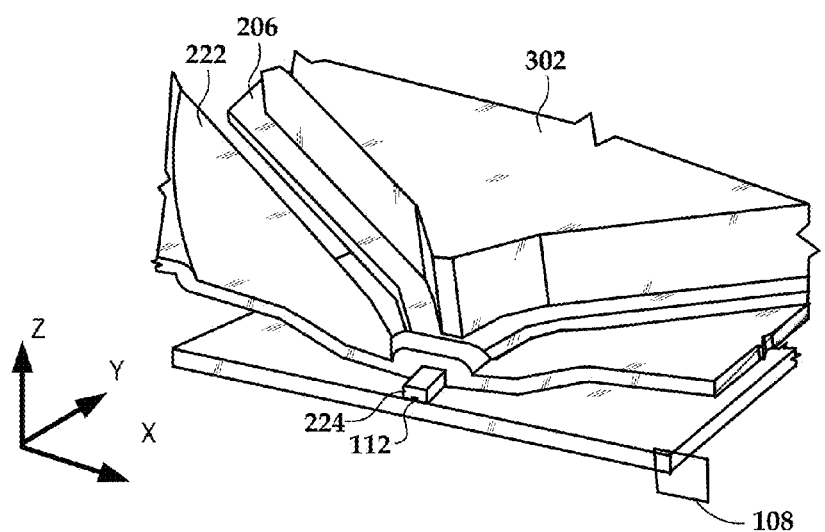
FIGS. 3 and 4 are perspective views showing a heat sink region according to example embodiments.
Figure 4:
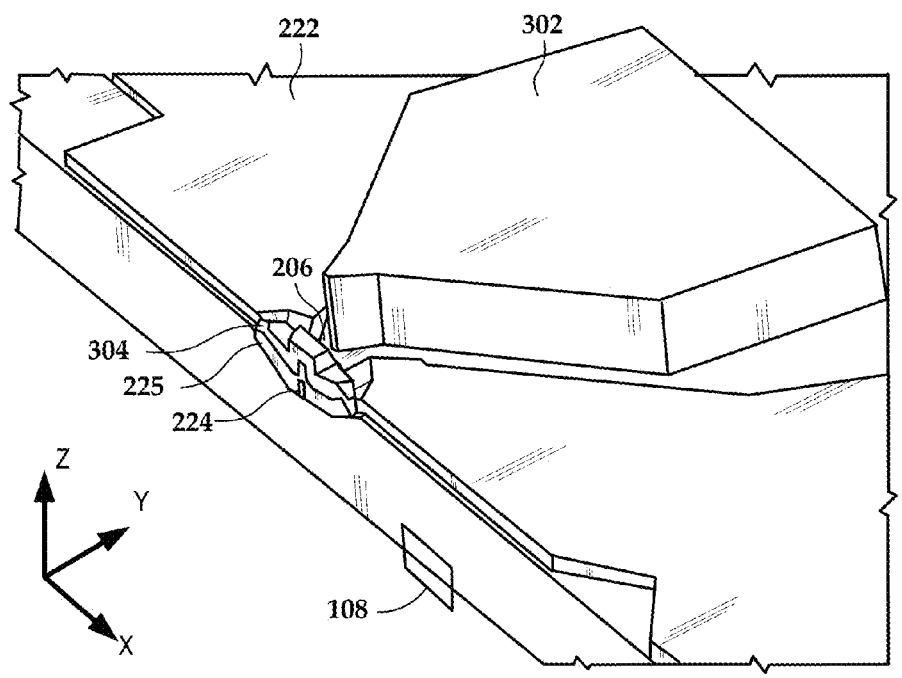

FIGS. 3 and 4 illustrate portions of the slider body 101 adjacent the media-facing surface 108. FIGS. 3 and 4 provide examples of the tip portion 224, the second heat sink region 222, the cap 225, the planar plasmon antenna 112 (shown in FIG. 3 only), and a portion of a return pole 302.

As shown in FIG. 4, the cap 225 is exposed at the media-facing surface 108 and extends in a cross-track direction around the tip portion 224. The second heat sink region 222 is spaced from the media-facing surface 108 adjacent the tip portion 224 by the cap 225. The second heat sink region 222 extends in the cross-track direction away from the tip portion 224. As illustrated in FIG. 4, the second heat sink region 222 and the cap 225 surround three sides of the tip portion 224. Also shown exposed at the media-facing surface 108 are the tip portion 224 of the write pole, a part of a return pole 302, and the planar plasmon antenna 112 (shown in FIG. 3 only).

It should be noted that the optical component(s) such as the waveguide of (FIGS. 1 and 2) may be exposed to the media-facing surface 108 or may be terminated away from the media-facing surface 108. However, in either embodiment, the waveguide extends to a location adjacent the media-facing surface.

Also seen in FIG. 4 is a second cap portion 304. The second cap portion 304 may be made from a different material than cap 225 or the same material. In the latter case, the second cap portion 304 may be considered integral with cap 225. Generally the second cap portion 304 is chosen to be resistant to at least one of burnish, corrosion, abrasion, and wear, as it may also be configured to extend outward from the media-facing surface when the planar plasmon antenna 112 is heated. The second cap portion 304 facilitates dissipating heat towards the return pole 302.

Figure 5:
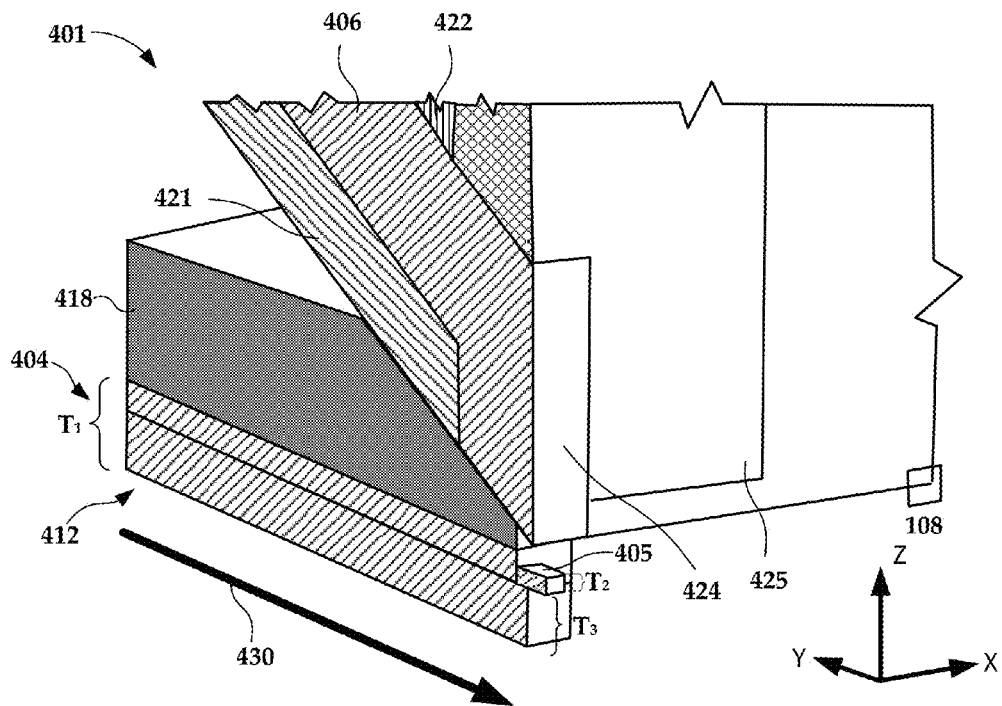
FIG. 5 is a perspective cutaway view of one embodiment of the planar plasmon antenna and surrounding components according to an example embodiment.
Figure 8:
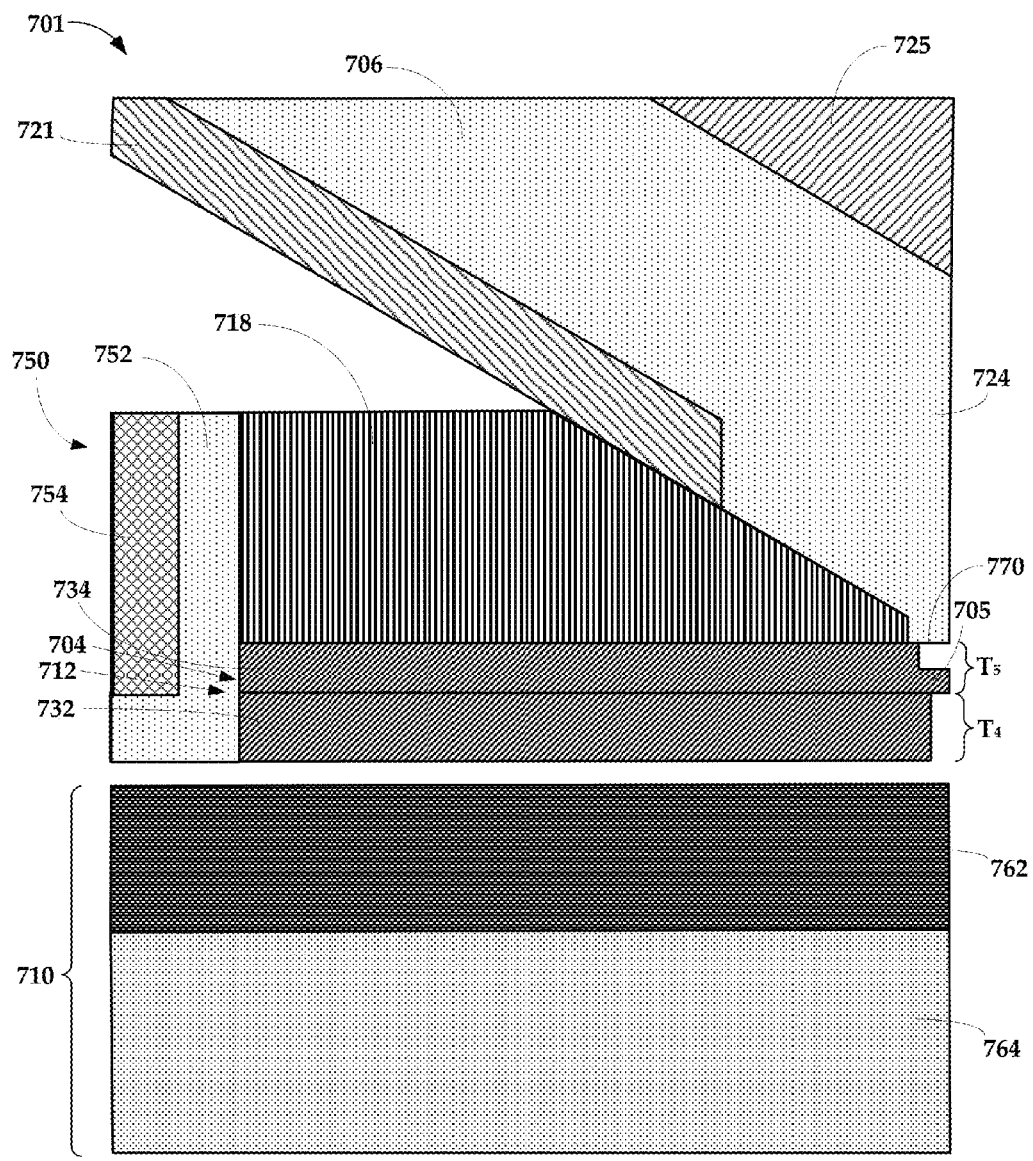
FIG. 8 is schematic cross-sectional view of another embodiment of the planar plasmon antenna, core, spacer, diffuser, and write pole.

FIG. 5 shows a perspective view of a portion of an apparatus 401 including an enlarged view of one embodiment of the planar plasmon antenna 412 and surrounding components. A magnetic write pole 406 is illustrated as having a tip portion 424 disposed proximate the media-facing surface 108 in FIG. 5. An optical component, such as shown in FIGS. 2 and 8, extends to a location adjacent the media-facing surface 108. As shown in FIG. 5, the optical component has a transmission direction toward the media-facing surface as indicated by arrow 430. The planar plasmon antenna 412 is disposed between the tip portion 424 of the magnetic write pole 406 and the optical component. As discussed previously, the planar plasmon antenna 412 is formed of a plasmonic material (e.g., Au, Ag, etc.) operationally capable of a plasmonic excitation, such as in response to an evanescent coupling with an optical mode of the optical component. The planar plasmon antenna 412 includes an enlarged region 404 spaced from a core of the optical component. The enlarged region 404 has a thickness $T_1$ in a direction substantially transverse to the optical component (i.e. the thickness $T_1$ as measured in the transverse direction extends substantially along the z-direction of the Cartesian coordinate system illustrated while the arrow 430 extends generally along the y-direction).

Additionally, the planar plasmon antenna 412 includes a peg region 405 formed in the enlarged region 404. The peg region 405 has a thickness $T_2$ in a direction substantially transverse to the optical component that is less than the thickness $T_3$ of a portion of the enlarged region 404 that spaces the peg region 405 from the optical component. The thickness $T_3$ is measured in a direction substantially transverse to the optical component similar to thicknesses $T_1$ and $T_2$. In some embodiments, the thickness $T_3$ of the portion of the enlarged region 404 that spaces the peg region 405 from the core of the optical component is between 25 nm and 125 nm. Thus, a substantial portion of the enlarged region 404 (having a thickness of over 50 percent of the total thickness $T_1$ of the enlarged region 404) is disposed between the peg region 405 and the optical component.

As shown in the embodiment of FIG. 5, a first heat sink region 418 abuts the enlarged region 404 and disposed between the planar plasmon antenna 412 and the write pole 406. The first heat sink region 418 has a media-facing portion disposed adjacent the tip portion 424. This media-facing portion has a variable thickness in a direction substantially transverse to the optical pathway. Another portion of the first heat sink region 418 is spaced from the write pole 406 and thermal diffuser 421 and has a thickness in a direction substantially transverse to the optical pathway of between 75 nm and 200 nm in some embodiments. As shown in the embodiment of FIG. 5, the first heat sink region 418 abuts the thermal diffuser 421 as well as the write pole 406 and the enlarged region 404.

In turn, thermal diffuser 421 can abut both the first heat sink region 418 and a second heat sink region 422 and can be disposed along one or more sides of the write pole 406. The second heat sink region 422 can be spaced from a first side surface of the tip portion and can extend away from the planar plasmon antenna 412. Cap 425 spaces the second heat sink region 422 from the media-facing surface 108.

Figure 6:
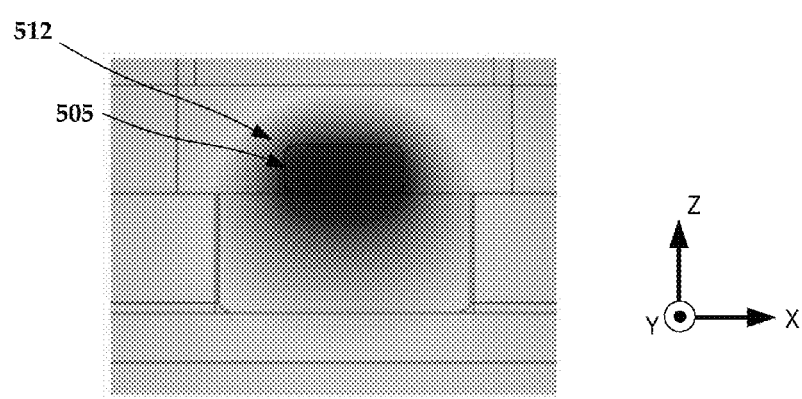
FIG. 6 is a schematic plan view of a media-facing surface also illustrating a temperature map that results from plasmonic excitation of a peg region of the planar plasmon antenna during operation.

FIG. 6 comprises a plan view of a peg region 505 of a planar plasmon antenna 512 as viewed along the media-facing surface 108 (FIGS. 1 and 2). FIG. 6 additionally shows a simulation of media temperature and a temperature profile (e.g., a thermal gradient) that results from the configuration of the planar plasmon antenna 512 and the peg region 505. FIG. 6 shows an embodiment where the peg region 505 has a substantially rectangular shape along a media-facing surface thereof. FIG. 6 illustrates that the configurations and components discussed herein allow for a more confined thermal gradient (e.g., a smaller thermal spot on the media) and also allow higher media temperatures to be achieved.

Figure 7A:
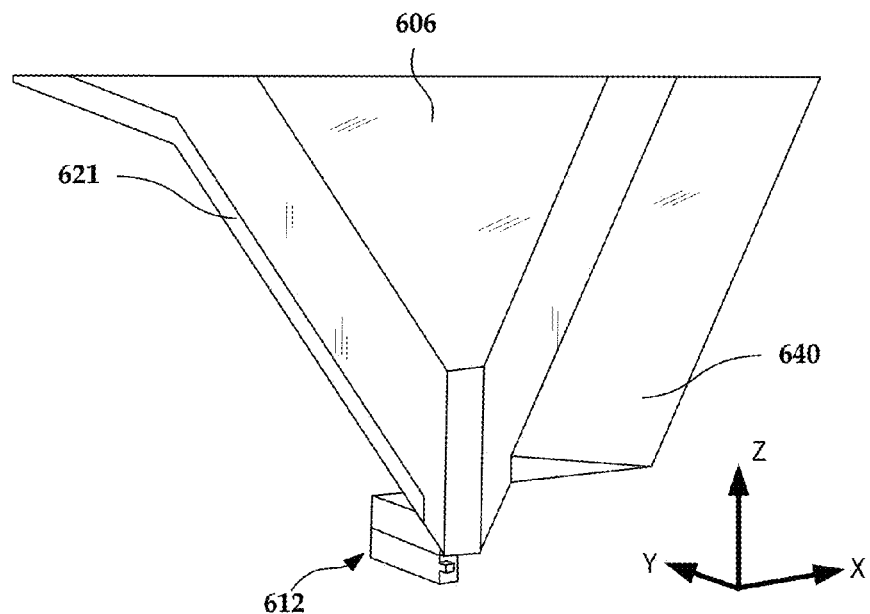
FIG. 7A is a perspective view showing an embodiment of the planar plasmon antenna, a write pole, and a diffuser.
Figure 7B:
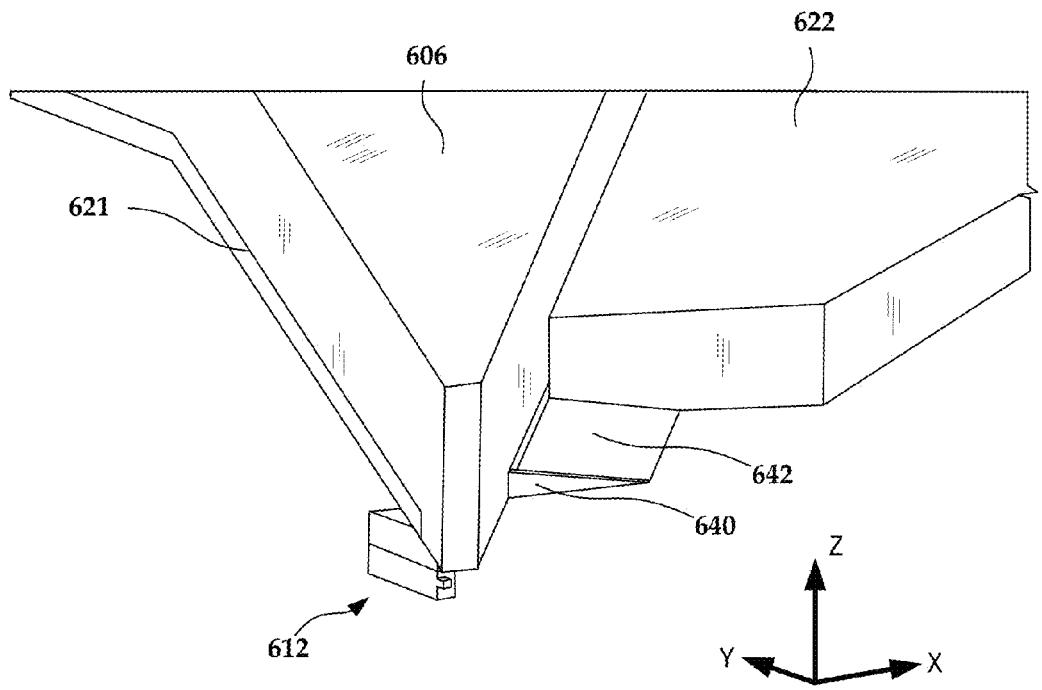
FIG. 7B shows the embodiment of claim 7A with the addition of a seed layer and a second heat sink region.

FIGS. 7A and 7B show perspective views of embodiments of a planar plasmon antenna 612, a write pole 606, and a diffuser 621. The diffuser 621 extends along one side of write pole 606 and forms a ledge 640 that extends therefrom generally in a cross-track direction. FIG. 7B shows a fabrication step where a seed layer 642 such as Ta, Zr, ZrN, ZrAu, Cr, and/or alloys thereof are deposited along the ledge 640. The second heat sink region 622 is formed and disposed on the seed layer 642. As illustrate in FIG. 7B, the second heat sink region 622 can be spaced from the write pole 606 by a gap. In some embodiments, this gap can be between 10 nm and 50 nm.

FIG. 8 is a schematic cross-sectional view of various components of an apparatus 701 according to one embodiment. The various components illustrated can be used together in some instances, or can be used in various combinations or separately according to various embodiments. FIG. 8 illustrates components that include an planar plasmon antenna 712, a write pole 706 with a tip portion 724, a core 710, a first heat sink region 718, a thermal diffuser 721, a cap 725, and a spacer 750. The planar plasmon antenna 712 includes an enlarged region 704 and a peg region 705. The enlarged region 704 includes a first layer 732 and a second layer 734. The spacer 750 includes a higher reflective index portion 752 and a lower reflective index portion 754. Similarly, the core 710 includes a higher reflective index portion 762 and a lower reflective index portion 764.

As illustrated in FIG. 8, the tip portion 724 of the write pole 706 has a surface 770 that abuts the enlarged region 704 of the planar plasmon antenna 712. The enlarged region 704 can be formed of the first layer 732 and the second layer 734. The first layer 732 is spaced from the core 710 of the optical component and has a first thickness $T_4$ in a direction substantially transverse to the optical component (i.e. the thickness $T_4$ as measured in the transverse direction extends substantially along the z-direction of the Cartesian coordinate system illustrated while the core 710, etc. extends generally along the y-direction).

The second layer 734 abuts the first layer 732 and is spaced from the core 710 of the optical component by the first layer 732. The second layer 734 has a second thickness $T_5$ in a direction substantially transverse to the optical component that is less than the first thickness $T_4$ of the first layer 732.

As shown in the embodiment of FIG. 8, the peg region 705 extends from the second layer 734 to adjacent the media-facing surface 108 (FIGS. 1 and 2). Additionally, in some embodiments, the first layer 732, the second layer 734, and the peg region 705 are all operationally capable of a plasmonic excitation, such as in response to an evanescent coupling with an optical mode of the optical component.

In the embodiment of FIG. 8, the optical component can comprise, for example, a waveguide with a core 710. The higher reflective index portion 762 is disposed adjacent the planar plasmon antenna 712. The lower reflective index portion 764 is spaced from the planar plasmon antenna 712 by the higher reflective index portion 762. The higher reflective index portion 762 and the lower reflective index portion 764 can have reflective indices of 2.4 and 2.1, for example. The higher reflective index portion 762 can be formed of one or more layers comprised of $TiO_2$ or $Nb_2O_5$, for example. Generally, any combination of higher index materials (e.g., $TiO_2$, $Nb_2O_5$, $Ta_2O_5$, $HfO_2$, $ZrO$) may be used for the higher reflective index portion 762. Similarly, lower index materials that can be used for the lower reflective index portion 764 and can include $SiO_2$, $Al_2O_3$, $Y_2O_3$, MgO, SiOxNy, metals (Ti, Ta, Nb, Hf, Zr, Y), doped silicon-based oxide/oxynitrides/metals (Ti, Ta, Nb, Hf, Zr, Y), and doped aluminum-based oxide and oxynitride.

The spacer 750 can be disposed to abut the planar plasmon antenna 712 and/or the first heat sink region 718 along one or more surface opposing the media-facing surfaces. Similar to the core 710, the higher reflective index portion 752 can be disposed to abut the planar plasmon antenna 712 and/or first heat sink region 718. The lower reflective index portion 754 is spaced from the planar plasmon antenna 712 and/or the first heat sink region 718 by the higher reflective index portion 752. The higher reflective index portion 752 and the lower reflective index portion 754 can be formed of dielectric materials such as $SiO_2$, $Al_2O_3$, $Y_2O_3$, MgO, SiOxNy, metals (Ti, Ta, Nb, Hf, Zr, Y), doped silicon-based oxide/oxynitrides/metals (Ti, Ta, Nb, Hf, Zr, Y), and doped aluminum-based oxide and oxynitride.

Both the higher reflective index portion 752 and the higher reflective index portion 762 allow more light to reach the planar plasmon antenna 712, which in turn allows the planar plasmon antenna 712 to reach higher degrees of surface plasmon excitation. The higher degrees of surface plasmon excitation allow for a higher degree of energy transfer to the media.

Figure 9:
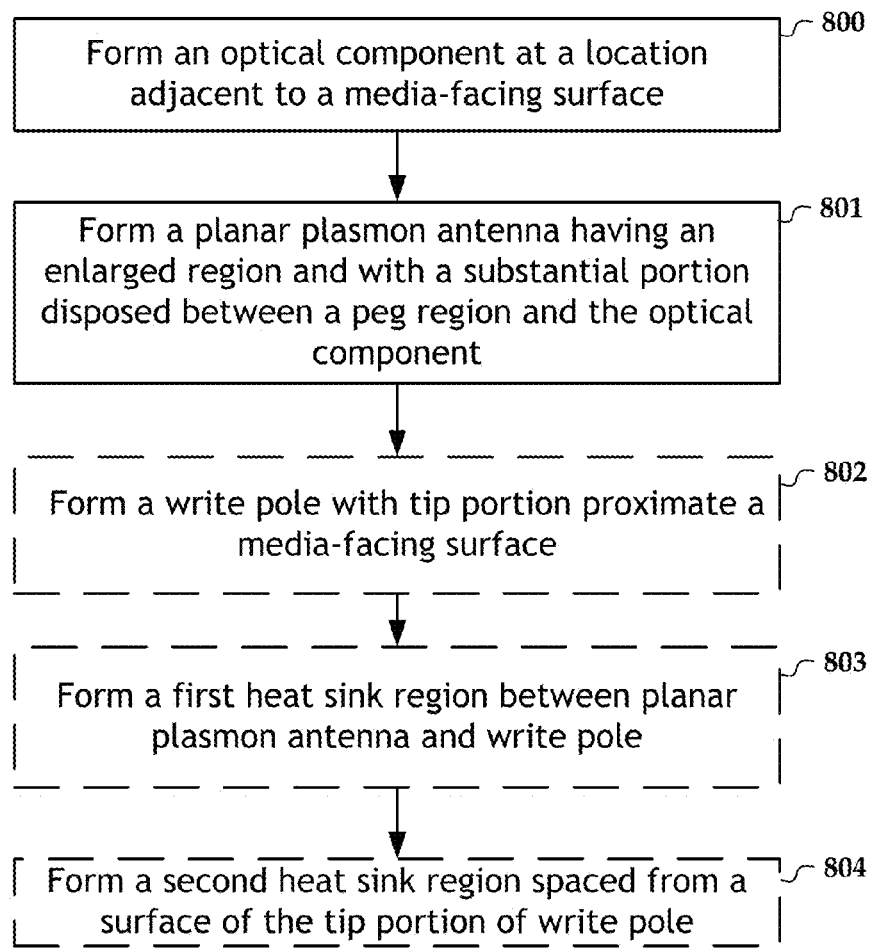
FIG. 9 is a flowchart illustrating a method according to an example embodiment.

In reference now to FIG. 9, a flowchart illustrates a method of forming a planar plasmon antenna according to an example embodiment. The method involves forming 800 an optical component adjacent a media-facing surface of a slider body. A planar plasmon antenna can be formed 801 having an enlarged region and a peg region. In some instances, a substantial portion of the enlarged region (having a thickness of over 50 percent of a total thickness of the enlarged region) can be disposed between the peg region and the optical component. Optionally, the method can further form 802 a magnetic write pole having a tip portion proximate the media-facing surface. In a further optional forming step 803 a first heat sink region can be formed between the planar plasmon antenna and the write pole. The first heat sink region can have a first portion with variable thickness in a direction substantially transverse to the optical component, and a second portion with a thickness in the direction substantially transverse to the optical component of between 75 nm and 250 nm. The method can optionally form 804 a second heat sink region spaced from a first side surface of the tip portion. The second heat sink region can extend away from the planar plasmon antenna in some embodiments.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus comprising:
   an optical component extending to a location adjacent a media-facing surface; and
   a planar plasmon antenna optically coupled to the optical component and formed of a plasmonic material operationally capable of a plasmonic excitation in response to an evanescent coupling with an optical mode of the optical component; wherein the planar plasmon antenna comprises:
      an enlarged region spaced from a core of the optical component; and
      a peg region formed in the enlarged region and having a thickness in a direction substantially transverse to the optical component that is less than the thickness of a portion of the enlarged region that spaces the peg region from the optical component.

2. The apparatus of claim 1, further comprising:
   a magnetic write pole having a tip portion proximate the media-facing surface; and
   a first heat sink region abutting the enlarged region and disposed between the planar plasmon antenna and the write pole.

3. The apparatus of claim 1, wherein the enlarged region comprises:
   a first layer spaced from the core of the optical component and having a first thickness in a direction substantially transverse to the optical component;
   a second layer abutting the first layer and spaced from the core of the optical component by the first layer, wherein the second layer has a second thickness in a direction substantially transverse to the optical component that is less than the first thickness of the first layer, wherein the peg region extends from the second layer to adjacent the media-facing surface, and wherein the first layer, the second layer, and the peg region are all operationally capable of plasmonic excitation in response to the evanescent coupling with the optical mode of the optical component.

4. The apparatus of claim 1, further comprising:
   a magnetic write pole having a tip portion proximate the media-facing surface; and
   a second heat sink region spaced from a first side surface of the tip portion and extending away from the planar plasmon antenna.

5. The apparatus of claim 1, further comprising a thermal diffuser disposed along one or more sides of a write pole, wherein the thermal diffuser abuts both a first heat sink region and a second heat sink region.

6. The apparatus of claim 5, wherein one or more of the thermal diffuser, the first heat sink region, and the second heat sink region are formed of thermally conductive metal that comprises at least one of Au, Ag, Cu, and Al.

7. The apparatus of claim 1, wherein the peg region has a substantially rectangular shape along a media-facing surface thereof.

8. The apparatus of claim 1, wherein the thickness of the portion of the enlarged region that spaces the peg region from the core of the optical component is between 25 nm and 125 nm.

9. The apparatus of claim 1, wherein the optical component comprises a channel waveguide, and wherein the core has a first refractive index and a second refractive index that is higher than the first refractive index.

10. The apparatus of claim 1, further comprising a spacer disposed along a non-media interfacing surface of the planar plasmon antenna, wherein the spacer is comprised of a first portion having a first refractive index and a second portion having a second refractive index that is higher than the first refractive index.

11. The apparatus of claim 1, further comprising a tip portion of a write pole having a surface that abuts the enlarged region of the planar plasmon antenna.

12. An system comprising:
    a magnetic write pole having a tip portion proximate a media-facing surface;
    an optical component extending to a location adjacent the media-facing surface;
    a planar plasmon antenna disposed between the tip portion of the magnetic write pole and a core of the optical component and having an enlarged region with a thickness in a direction substantially transverse to the optical component that exceeds a thickness of a peg region;
    a first heat sink region abutting the enlarged region and disposed between the planar plasmon antenna and the write pole;
    a second heat sink region disposed to a first side surface of the tip portion and extending away from the planar plasmon antenna; and
    a thermal diffuser disposed along one or more sides of the write pole and abutting both the first heat sink region and the second heat sink region.

13. The system of claim 12, wherein the optical component comprises a channel waveguide, and wherein the core has a first refractive index and a second refractive index that is higher than the first refractive index.

14. The system of claim 12, wherein the enlarged region is spaced from the core of the optical component and has a thickness in a direction substantially transverse to the optical component of between about 50 nm and 150 nm, wherein the peg region is formed in the enlarged region and has a thickness in a direction substantially transverse to the optical component that is less than the thickness of a portion of the enlarged region that spaces the peg region from the core of the optical component, and wherein the thickness of the portion is between 25 nm and 125 nm.

15. The system of claim 12, wherein one or more of the thermal diffuser, the first heat sink region, and the second heat sink region are formed of thermally conductive metal that comprises at least one of Au, Ag, Cu, and Al.

16. The system of claim 12, wherein the optical component comprises a channel waveguide, and wherein the core has a first refractive index and a second refractive index that is higher than the first refractive index.

17. The system of claim 12, further comprising a spacer disposed along a non-media interfacing surface of the planar plasmon antenna, wherein the spacer is comprised of a first portion having a first refractive index and a second portion having a second refractive index that is higher than the first refractive index.

18. The system of claim 12, wherein the tip portion of the write pole has a surface that abuts the enlarged region of the planar plasmon antenna.

19. A method comprising:
    forming an optical component to adjacent a media-facing surface of a slider body; and forming a planar plasmon antenna having an enlarged region and a peg region, wherein a substantial portion of the enlarged region with a thickness of over 50 percent of a total thickness of the enlarged region is disposed between the peg region and the optical component.

20. The method of claim 19, further comprising:

forming a magnetic write pole having a tip portion proximate the media-facing surface;

forming a first heat sink region between the planar plasmon antenna and the write pole, wherein the first heat sink region has a first portion with variable thickness in a direction substantially transverse to the optical component and a second portion with a thickness in the direction substantially transverse to the optical component of between 75 nm and 250 nm; and forming a second heat sink region spaced from a first side surface of the tip portion and extending away from the planar plasmon antenna.

\* \* \* \* \*